US009511910B2

(12) United States Patent
Puccini

(10) Patent No.: US 9,511,910 B2
(45) Date of Patent: Dec. 6, 2016

(54) INTELLIGENT WINE CAPSULE

(71) Applicant: Steven D. Puccini, Chicago, IL (US)

(72) Inventor: Steven D. Puccini, Chicago, IL (US)

(73) Assignee: Wine Father Inc., Chicago, IL (US)

( * ) Notice: Subject to any disclaimer, the term of this patent is extended or adjusted under 35 U.S.C. 154(b) by 0 days.

(21) Appl. No.: 14/696,066

(22) Filed: Apr. 24, 2015

(65) Prior Publication Data

US 2015/0307245 A1 Oct. 29, 2015

Related U.S. Application Data

(60) Provisional application No. 61/983,673, filed on Apr. 24, 2014.

(51) Int. Cl.
| | | |
|---|---|---|
| *B65D 51/24* | (2006.01) | |
| *G06K 7/00* | (2006.01) | |
| *B65D 41/02* | (2006.01) | |
| *G01K 1/02* | (2006.01) | |
| *G01K 1/14* | (2006.01) | |
| *G06K 19/07* | (2006.01) | |
| *G06K 19/063* | (2006.01) | |

(52) U.S. Cl.
CPC ............ *B65D 51/245* (2013.01); *B65D 41/02* (2013.01); *G01K 1/022* (2013.01); *G01K 1/024* (2013.01); *G01K 1/14* (2013.01); *G06K 7/00* (2013.01); *G06K 7/0008* (2013.01); *B65D 2203/12* (2013.01); *G01K 2207/04* (2013.01); *G01K 2215/00* (2013.01); *G06K 19/063* (2013.01); *G06K 19/0723* (2013.01)

(58) Field of Classification Search
CPC .. G06K 7/0008; G06K 7/00; G06K 19/0723; G06K 19/063
See application file for complete search history.

(56) References Cited

U.S. PATENT DOCUMENTS

| | | | |
|---|---|---|---|
| 4,740,431 A | 4/1988 | Little | |
| 8,022,832 B2 | 9/2011 | Vogt | |
| 8,248,254 B2 | 8/2012 | Vogt | |
| 2003/0214399 A1* | 11/2003 | Naruse | G01K 1/026 340/531 |
| 2004/0008752 A1 | 1/2004 | Prabhakar | |
| 2004/0148117 A1 | 7/2004 | Kirshenbaum | |
| 2004/0189473 A1 | 9/2004 | Mickle | |
| 2005/0017602 A1* | 1/2005 | Arms | B60C 23/0411 310/339 |
| 2006/0290496 A1* | 12/2006 | Peeters | A61B 5/0002 340/572.1 |

(Continued)

OTHER PUBLICATIONS

PCT, Notification of Transmittal of the International Search Report and the Written Opinion of the International Searching Authority, or the Declaration, in International application No. PCT/US15/27610, dated Jul. 28, 2015 (14 pages).

(Continued)

*Primary Examiner* — Hongmin Fan
(74) *Attorney, Agent, or Firm* — McAndrews, Held & Malloy, Ltd.

(57) ABSTRACT

Embodiments of the present disclosure are directed to a temperature indicator (e.g., a data logger) that is configured to be attached to a beverage container and to provide a user with information relating to the temperature history of the beverage. In some embodiments, for example, the temperature indicator is configured for attachment to a wine bottle. For instance, the temperature indicator may be configured to indicate whether the temperature of the wine bottle has deviated outside of a predetermined temperature range. In this way, the temperature indicator could be used to provide consumers, wine makers, distributors, or retailers with important information regarding the quality of care provided for the beverage container.

27 Claims, 13 Drawing Sheets

(56) References Cited

U.S. PATENT DOCUMENTS

| | | | |
|---|---|---|---|
| 2008/0210762 A1* | 9/2008 | Osada | G06K 19/0701 235/492 |
| 2009/0233735 A1* | 9/2009 | Savarese | G08B 21/24 473/407 |
| 2011/0051641 A1* | 3/2011 | Pan | H04Q 9/00 370/311 |
| 2012/0185192 A1 | 7/2012 | Townsend | |
| 2012/0274470 A1 | 11/2012 | Sandvick | |
| 2013/0059534 A1 | 3/2013 | Sobal | |
| 2013/0070807 A1 | 3/2013 | Ponomarev | |
| 2013/0211928 A1* | 8/2013 | De Benito Secades | G06Q 30/00 705/15 |
| 2013/0271265 A1* | 10/2013 | Finn | H01Q 1/2225 340/10.1 |
| 2014/0246395 A1* | 9/2014 | Joubert | B65D 23/085 215/227 |
| 2015/0186770 A1* | 7/2015 | Arai | B65D 55/02 235/492 |

OTHER PUBLICATIONS

RF430FRL15xH NFC ISO 15693 Sensor Transponder, Texas Instruments, RF430FRL152H, RF430FRL153H, RF430FRL154H; SLAS834C—Nov. 2012—Revised Dec. 2014 (51 pages).

* cited by examiner

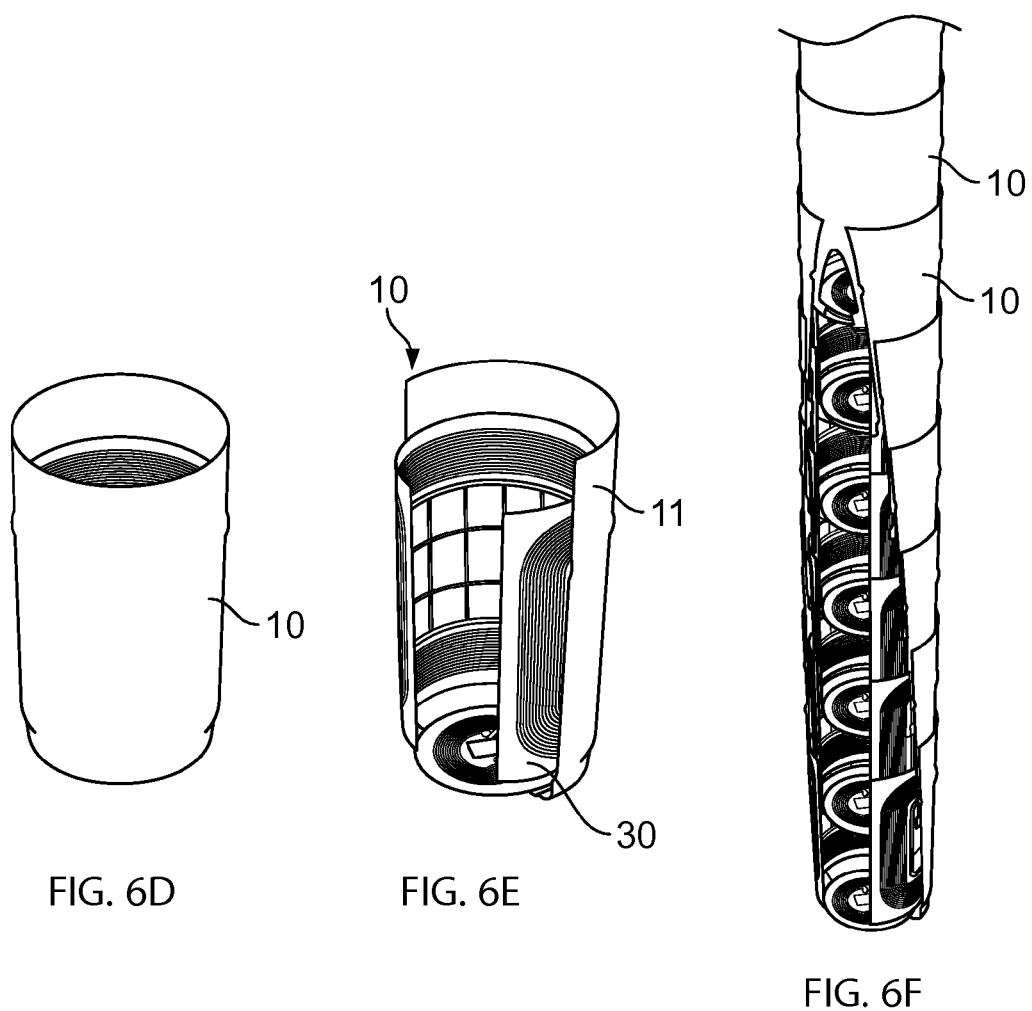

INTELLIGENT WINE CAPSULE

CROSS REFERENCE TO RELATED APPLICATIONS

This application claims priority to U.S. Provisional Application No. 61/983,673, filed on Apr. 24, 2014, the entirety of which is incorporated herein by reference in its entirety.

FEDERALLY SPONSORED RESEARCH OR DEVELOPMENT

[Not Applicable]

JOINT RESEARCH AGREEMENT

[Not Applicable]

SEQUENCE LISTING

[Not Applicable]

BACKGROUND

Many beverages are temperature sensitive. Wine, for example, is known to degrade when subjected to temperatures above about 72° or below about 40°. Yet there is presently no cost-effective or non-intrusive way of tracking the temperature of a bottle of wine.

SUMMARY

Embodiments of the present disclosure are directed to a temperature indicator (e.g., a data logger) that is configured to be attached to a beverage container and to provide a user with information relating to the temperature history of the beverage. In some embodiments, for example, the temperature indicator is configured for attachment to a wine bottle. For instance, the temperature indicator may be configured to indicate whether the temperature of the wine bottle has deviated outside of a predetermined temperature range. In this way, the temperature indicator could be used to provide consumers, wine makers, distributors, or retailers with important information regarding the quality of care provided for the beverage container.

According to certain embodiments, a data logger is configured for attachment to a wine bottle that holds wine. The data logger includes at least one energy storage component (e.g., one or more capacitors), an energy harvester, a temperature sensor, at least one processor, at least one first memory, and at least one wireless communicator. The energy harvester harvests ambient electromagnetic energy and transfers the harvested electromagnetic energy to the at least one energy storage component. The temperature sensor generates a temperature signal corresponding to a temperature. The at least one processor receives energy from the at least one energy storage component, receives the temperature signal, and generates data representative of the temperature signal. The at least one first memory receives energy from the at least one energy storage component and communicate with the at least one processor, wherein the at least one first memory is configured to store the data representative of the temperature signal. The at least one wireless communicator wirelessly transmits the data representative of the temperature signal.

The data logger may include a photovoltaic coating, wherein the photovoltaic coating is configured to receive light and responsively generate energy, and wherein the energy generated by the photovoltaic coating is stored in the at least one energy storage component.

The data logger may also include a humidity sensor, a motion sensor, a location sensor, or a gas sensor.

The at least one wireless communicator may include a radio-frequency identification (RFID) communication component. The RFID communication component may include an antenna that also serves as the temperature sensor. In such a configuration, the antenna of the RFID communication component may include two different metals connected (e.g., brazed, soldered, printed, etc.) through one or more junctions (e.g., sensing junctions such as a cold junction or a t-junction). The at least one wireless communicator may include a near-field communication (NFC) component.

The at least one processor and the at least one first memory may turn ON once a sufficient amount of energy is stored in the at least one energy storage component and turn OFF after storing the data representative of the temperature. The data logger may indicate whether the temperature has deviated outside of a predetermined temperature range (e.g., greater than an upper temperature threshold and/or less than a lower temperature threshold). The at least one first memory is may store the data representative of the temperature signal only if the temperature has deviated outside of the predetermined temperature range.

The data logger may be arranged inside of a wine capsule, for example, adhered (e.g., printed) to an inner surface of the capsule. Accordingly, the intelligent wine capsule may have substantially the same outward appearance as a conventional wine capsule. The data logger may include a thin film capacitor layer including the at least one capacitor adhered to a base layer, which is adhered to an inner surface of the wine capsule. The at least one wireless communicator may be printed onto the thin film capacitor layer. The at least one processor may be arranged (e.g., printed) on an inner surface of a top portion of the wine capsule.

The data logger may include at least one second memory configured to store data representative of at least one of varietals of grape, percentages of each varietal in the wine, vintage, information about a winemaker of the wine, geographical information about the grapes and/or winery, advertising information, or cost of the wine bottle holding the wine.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

Figure 1:
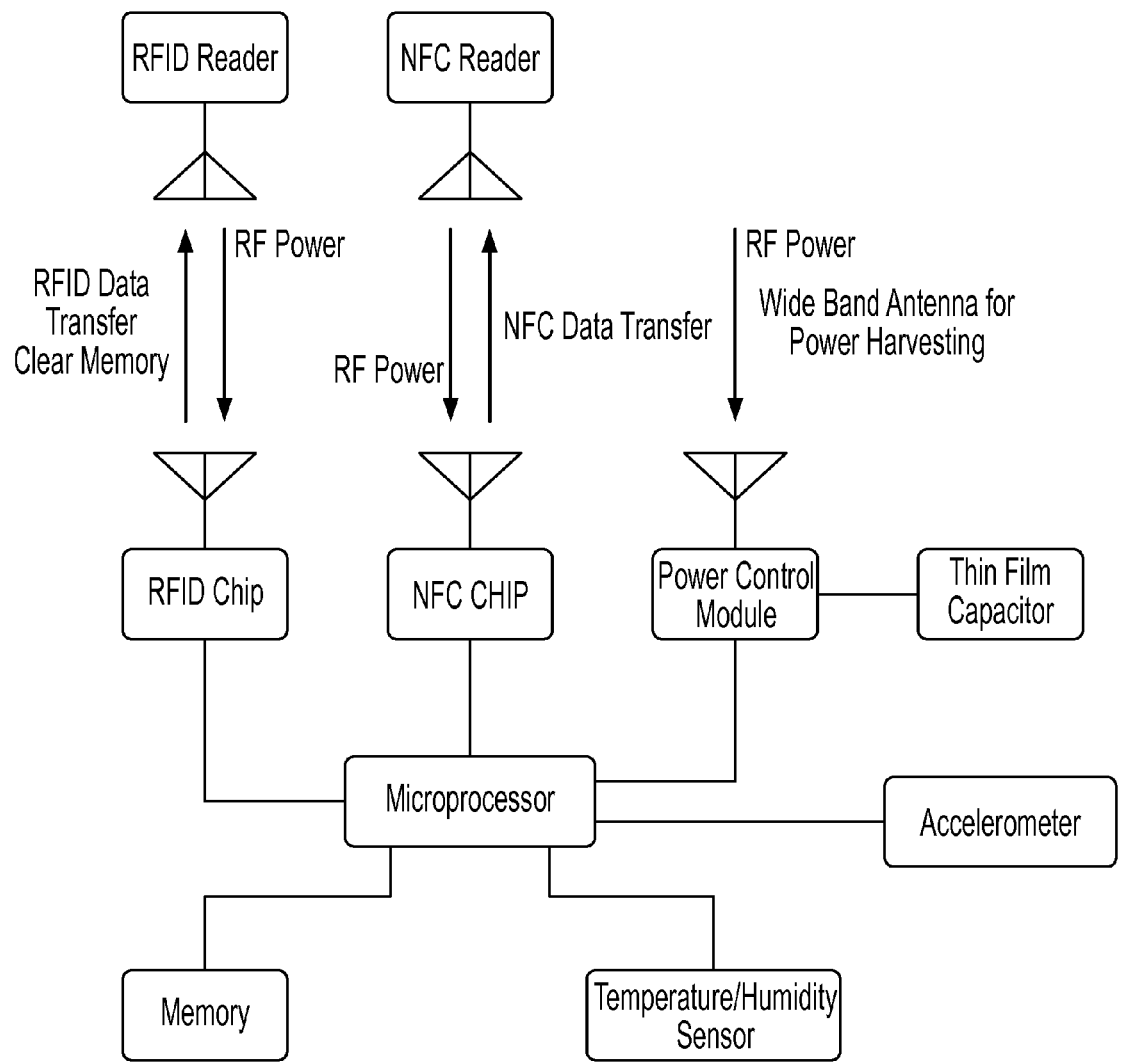
FIG. 1 illustrates a block diagram showing the electronic components of an embodiment of an intelligent wine capsule and its interaction with remote scanning components.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Reference will now be made in detail to certain embodiment(s), examples of which are illustrated in the accompanying drawings. Whenever possible, the same reference numerals will be used throughout the drawings to refer to the same or like parts.

Embodiments of the present disclosure are directed to a data logger that is configured to be attached to a beverage container (e.g., in the form of a wine capsule one a wine bottle). The temperature indicator may be configured to identify whether or not a temperature-sensitive beverage has been cared for in such a manner that the temperature of the beverage has remained within the prescribed temperature range at which damage due to heat and/or cold is prevented. Accordingly, the beverage temperature indicator may be useful in connection with any beverage that spoils, breaks down, or otherwise degrades when subjected to high and/or low temperatures. Specific embodiments of the present disclosure are directed to data loggers that are configured for attachment to a bottle of wine. However, it is contemplated that embodiments of the data logger may also be attached to or otherwise incorporated into the packaging of other temperature-sensitive beverages or food more generally.

In some embodiments, a data logger of the type described herein may be incorporated into the conventional packaging of the beverage. For example, where the data logger is configured for attachment to a bottle of wine, the data logger may be incorporated into a wine capsule (e.g., printed on the capsule) in order to provide an intelligent wine capsule.

Conventionally, after filling, a wine bottle is sealed with a cork, either natural or artificial, which is then covered by a wine capsule, also sometimes referred to as a foil. More recently, it has become common to provide a screw cap in place of a cork. In these instances, the screw cap is generally attached by a breakable connection to a lower skirt, with the combination of the screw cap and lower skirt being configured to resemble the traditional wine capsule. For purposes of the present disclosure, the term wine capsule should be considered to refer to both the protective sleeve that is placed over top of the cork as well as the screw cap and skirt combination that is designed to provide substantially the same appearance as the traditional protective sleeve.

Figure 8:
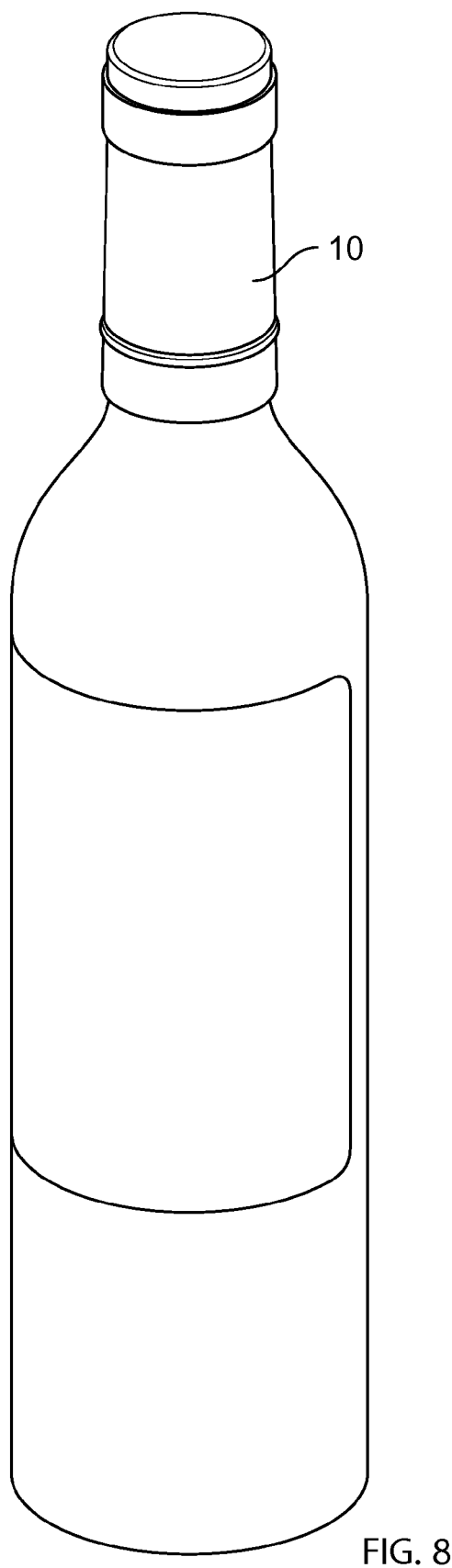
FIG. 8 depicts a perspective view of a wine bottle containing an embodiment of an intelligent wine capsule

In some embodiments, such as that illustrated in FIG. 8, the intelligent wine capsule 10 may comprise an outer layer 11 that resembles a conventional wine capsule. The various components that provide for the sensing, storing, and transmitting of data may all be located interior to the outer layer 11 of the intelligent wine capsule 10. In this way, the intelligent wine capsule 10 may provide a bottle of wine to which it is attached with the outward appearance of a conventional wine bottle. The positioning of each of the components on the interior of the wine capsule 10 also serves to protect the components from damage. In addition to providing certain aesthetic benefits, the incorporation of the components on the interior of the wine capsule 10 may also serve to avoid the need for additional fittings to the wine bottle that might interfere with the shipping, storage, and/or retail display of the bottle. Additional benefits obtained by the intelligent wine capsules 10 of embodiments of the present disclosure are described in more detail throughout the specification.

The outer layer 11 of the wine capsules of the present disclosure may be made of any conventional wine capsule material, including for example plastics or metals. Plastics used for wine capsules include heat-shrink plastics (such as polyethylene, polyvinyl chloride (PVC), Kapton®, or the like), biodegradable plastics (such as polyhydroxybutyrate), rigid PVC, polylaminates, and the like. Metals used for wine capsules include tin, aluminum, and the like. If desired, the outer layer 11 of the wine capsule 10 may be printed and/or etched with commercial or decorative logos and the like, as is done with conventional wine capsules. The various components that provide for the sensing, storing, and transmitting of data may be integrated into the wine capsule material in any number of ways, including by any of the methods that are subsequently described in more detail below.

Figure 9:
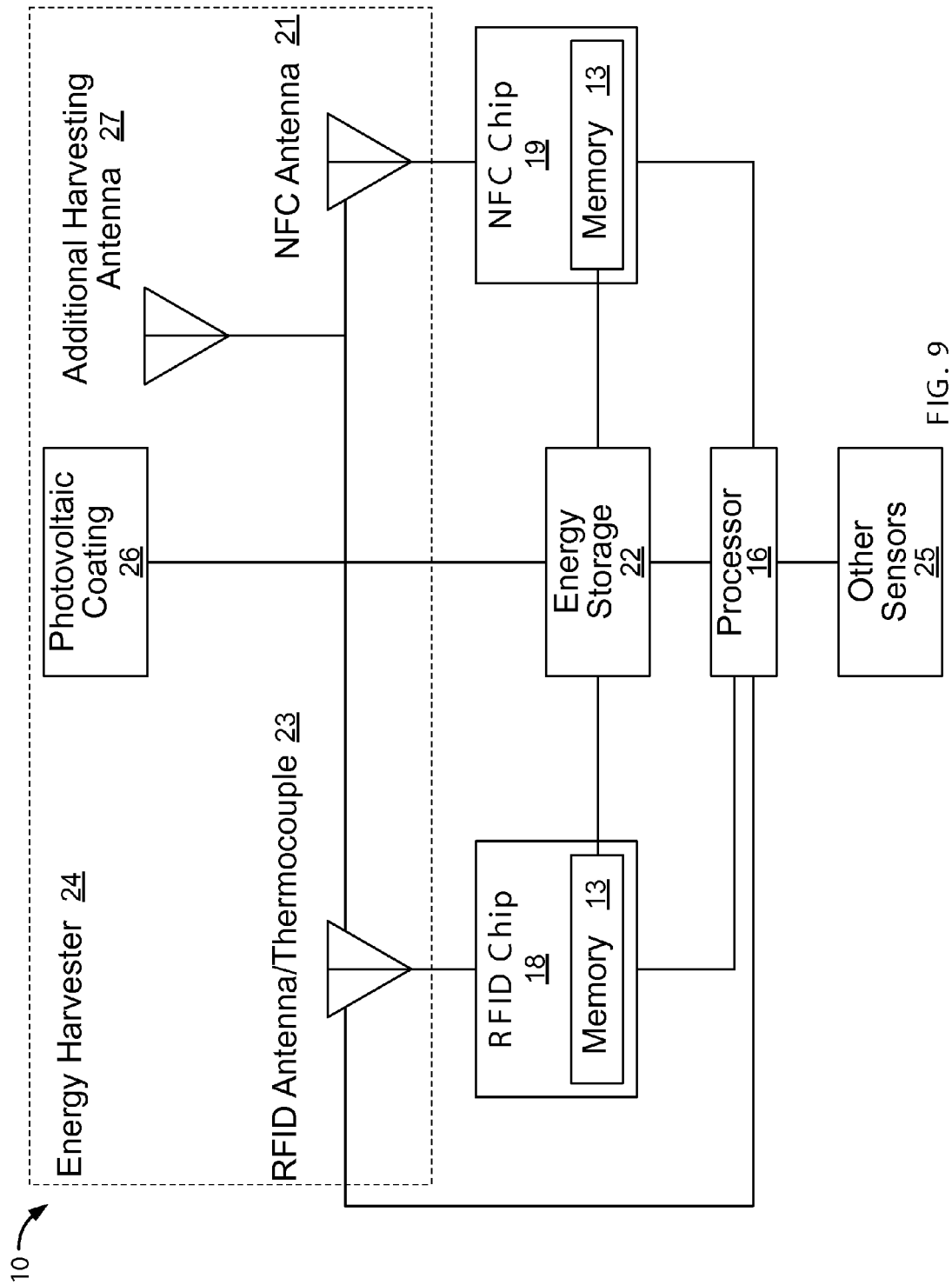
FIG. 9 depicts a block diagram of components in an embodiment of an intelligent wine capsule.

As shown in FIG. 9, an embodiment of the intelligent wine capsule 10 may include an RFID antenna 23, a corresponding RFID chip 18 with one or more memories 13, an NFC antenna 21, a corresponding NFC chip 19 with memory 13, a photovoltaic coating 26 on the outside of the capsule 10, energy storage component 22, a processor 16, and other sensors 25. One or more of the RFID antenna 23, NFC antenna 21, harvesting antenna 27 (e.g., wideband harvesting antenna), other antenna(s) (not shown), or photovoltaic coating 26 may be understood to be part of an energy harvester 24. For simplicity, a processor 16 is referred to, but it is understood that the functionality of this component may be performed by two or more distributed processors. The temperature sensor may generate a temperature signal that corresponds to the sensed temperature.

The one or more memories 13 (simply referred to herein as memory 13 for convenience) may be located in the RFID chip 18 and/or NFC chip 19. Memory 13 may also be located outside of the RFID and NFC chips 18, 19. Memory 13 may be any type or combination of types of memory, such as non-volatile RAM (e.g., flash), RAM, EEPROM, etc. According to certain embodiments, the memory 13 is a flash memory that is capable of retaining stored data even when the memory 13 is not powered.

The RFID, NFC, and/or additional harvesting antennas 23, 21, 27 may be used for remote interrogation and/or energy harvesting. The antennas 23, 21, 27 (and/or additional antennas not shown) may receive electromagnetic energy from the following sources: RFID RF (e.g., 3.1-10 GHz, 902-928 MHz (NA), 865-868 MHz (EU), 433 MHz, 13.56 MHz, 12-150 KHz); cellular (e.g., 2.5 GHz, 2.1 GHz, 1.9 GHz, 1.7 GHz, 900 MHz, 850 MHz, 800 MHz); Television (e.g., VHF Low (54-88 MHz), VHF High (174-216) MHz, UHF (470-890 MHz)); NFC RF (e.g., 13.56 MHz); and/or WiFi (e.g., 5 GHz or 2.4 GHz). The received energy may be transmitted to circuitry and/or conductors (i.e., energy harvester) and ultimately stored in one or more storage components (e.g., capacitor(s), thin film capacitor(s), or batter(ies)).

In some embodiments, a photovoltaic component such as a photovoltaic coating 26 may capture energy from light (e.g., sunlight, incandescent light, LED light, fluorescent light, etc.) For example, in some embodiments, a photovoltaic coating 26 may be applied to an outer portion of the wine capsule. According to one embodiment, the photovoltaic coating 26 is substantially transparent, such that the intelligent wine capsule 10 maintains the outward appearance of a conventional wine capsule. The photovoltaic coating 26 can be electrically connected with one or more of the electrical components (e.g., storage 22). Energy received at the photovoltaic coating 26 may be transferred to the storage 22 via one or more conductors that either pass through the wine capsule 10 or go around the bottom edge of the wine capsule 10.

The energy stored at the storage component 22 may be used to power the processor 16 or one or more memories 13. In this way, the relatively small amounts of energy that are received by antennas 23, 21, and/or 27 can be stored until a threshold activation energy for the operation of one or more components (e.g., processor 16, memor(ies) 13, thermocouple 23, or other sensors 25) is reached. Once the threshold activation energy is collected by the storage component 22, the energy may be released and the one or more components may be activated.

Once the processor 16 is activated, it may receive a temperature signal from the thermocouple 23 and convert it to digital data. Signals from the other sensors 25 (e.g., humidity sensor, motion sensor, location (GPS) sensor, and/or gas sensor such as an arsenic sensor) may also be converted to digital data. It may then write the digital data (representative of the temperature signal and/or other signals) to the memor(ies) 13.

The thermocouple 23 (which is a type of temperature sensor) is configured to take temperature readings, which can represent or be used to generally determine the temperature of the wine. Any electrical temperature sensor can be used in combination with or as an alternative to the thermocouple 23. The temperature sensor may be connected or included in an integrated circuit including one or more processors (e.g., a microprocessor) 16.

Figure 2:
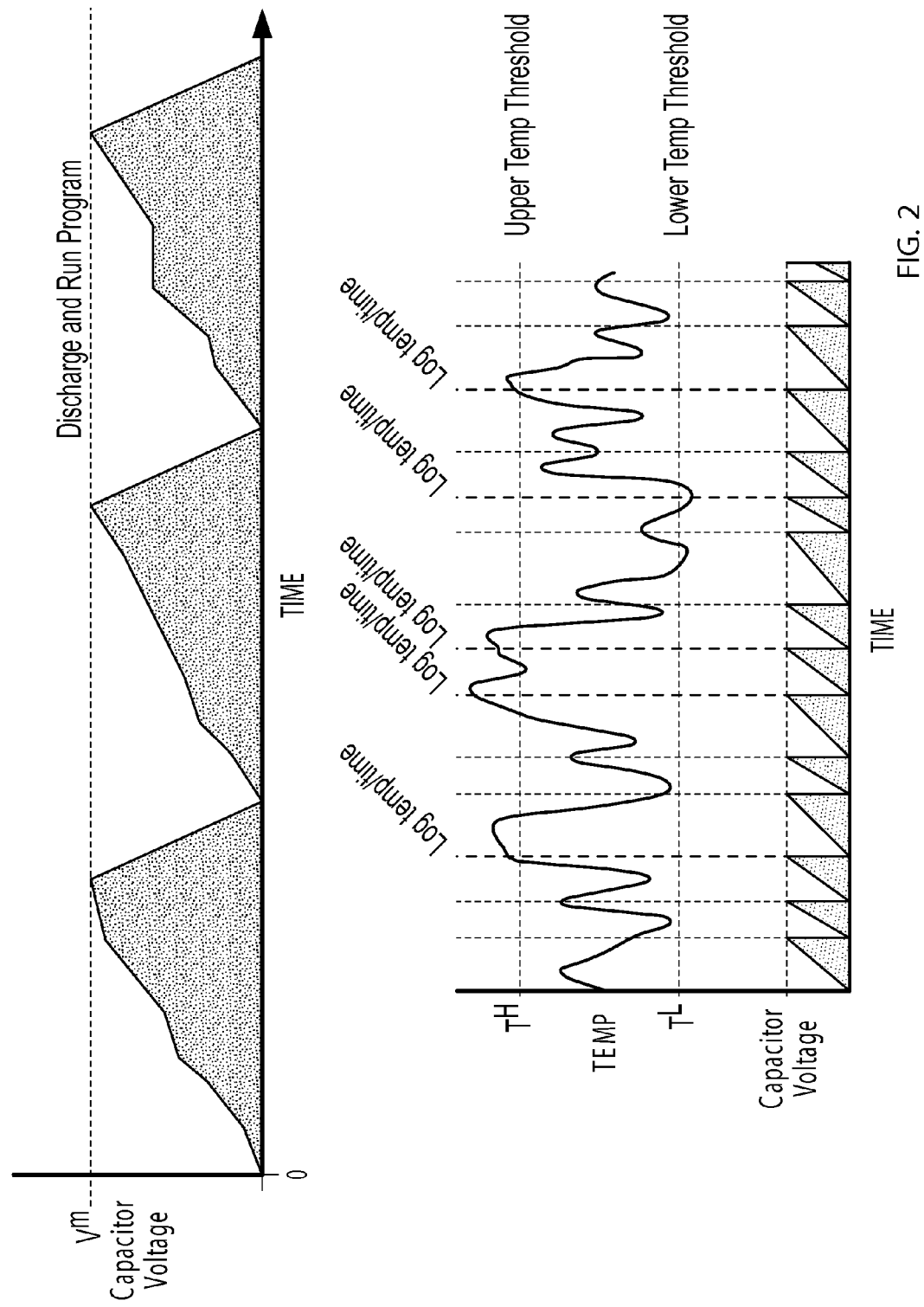
FIG. 2 depicts a graphical illustration showing the operation of an embodiment of an intelligent wine capsule over time.
Figure 3:
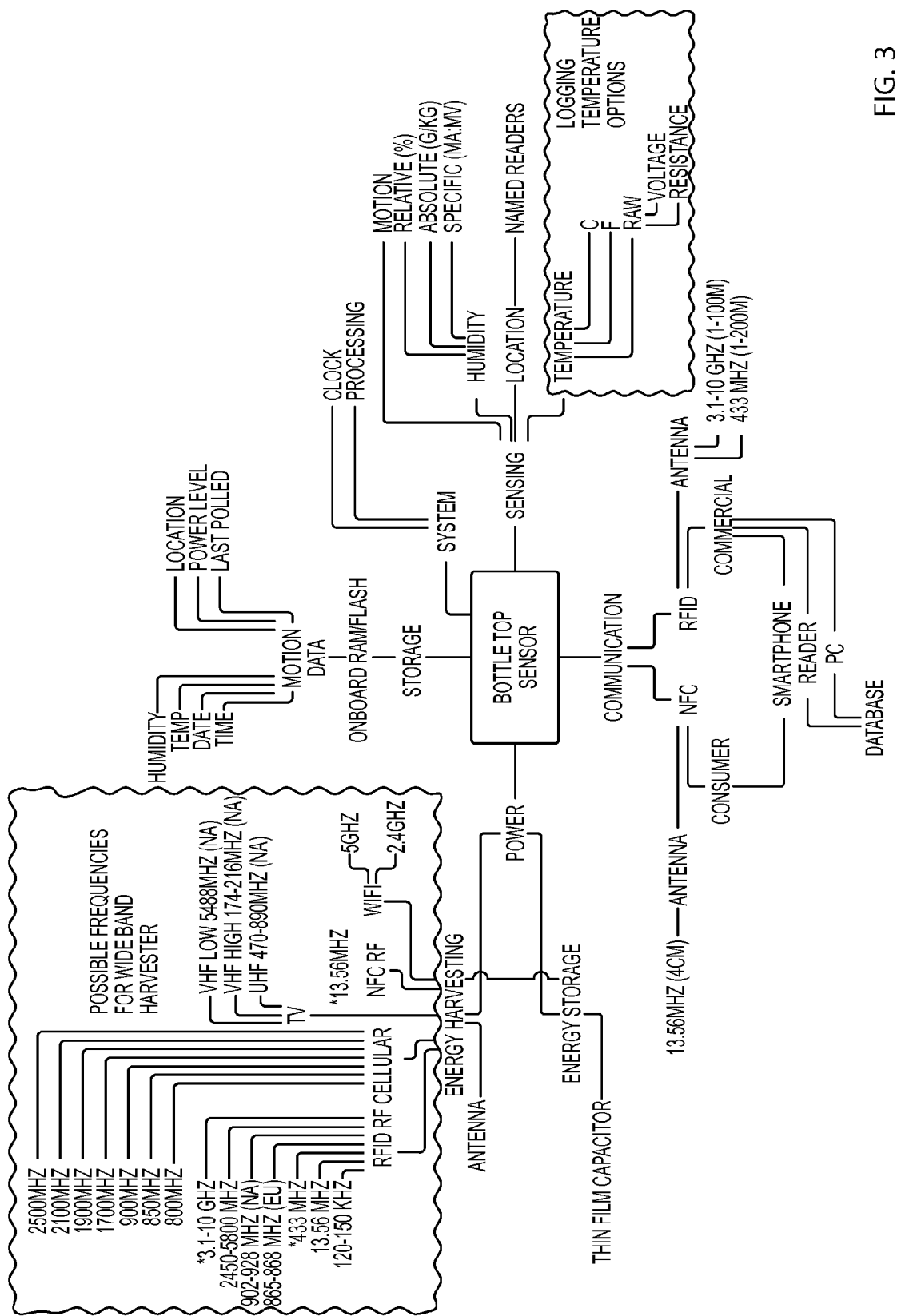
FIG. 3 depicts a block diagram showing the various components and operation of an embodiment of an intelligent wine capsule.
Figure 4:
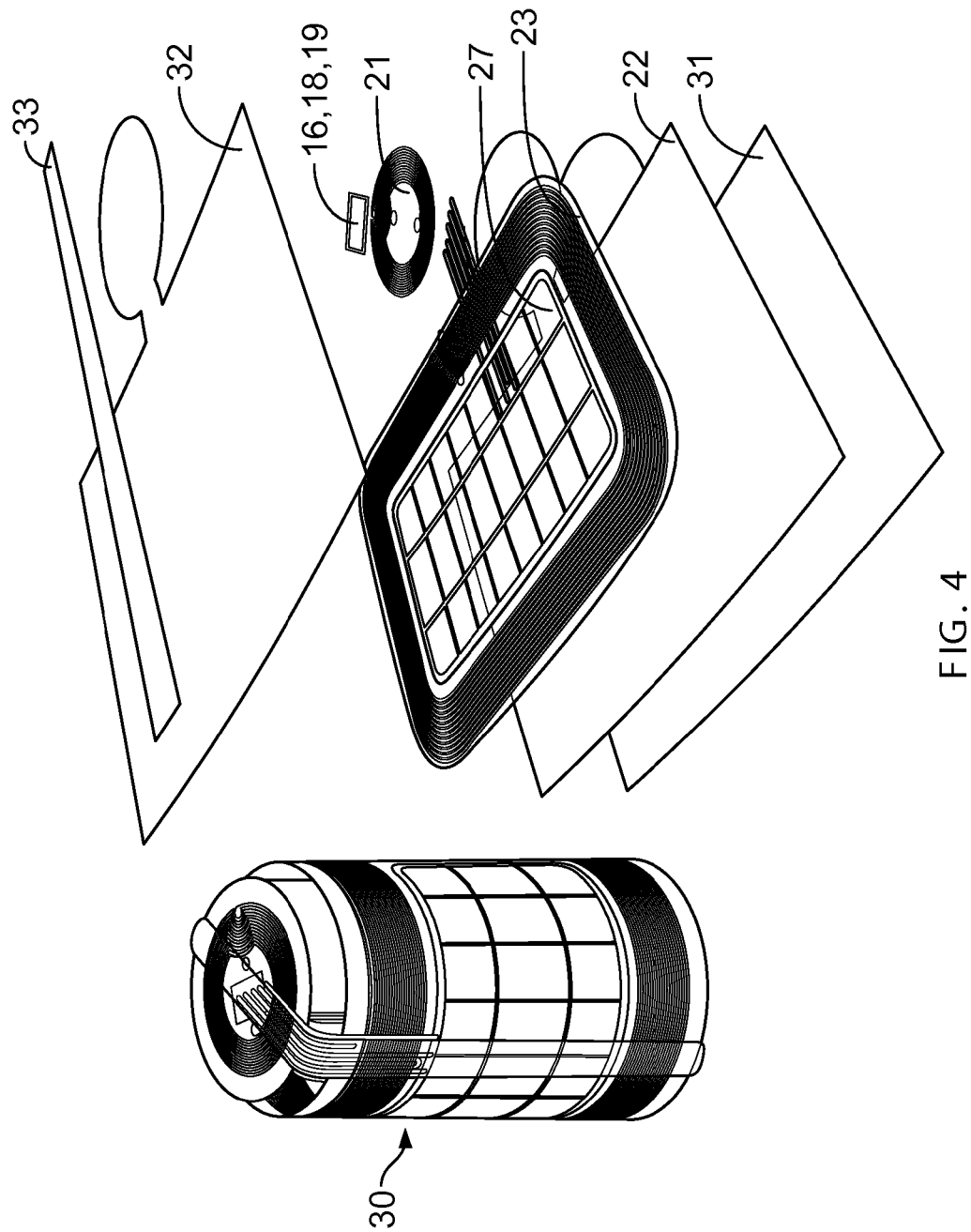
FIG. 4 depicts an exploded perspective view of an electronic-containing layer of an embodiment of an intelligent wine capsule.

To conserve memory, data, such as temperature data, may only be written to the memor(ies) 13 under certain conditions. In some embodiments, only certain temperature readings from the temperature sensor may be stored in the memory 13. For example, only temperature measurements that fall outside of a prescribed "safe" range may be stored in the memory 13. This is indicated in FIG. 2, which shows only temperature readings above an upper temperature threshold (e.g., 72°) and a lower temperature threshold (e.g., 40°) being logged. Time may also be logged or inferred from other time stamps (such as a time stamp written when the capsule 10 is interrogated by a remote device with time data from the remote device). Time data may include data corresponding to year, month, week, day, hour, minute, second, etc.

After writing the data to memory 13, the system may shut down to conserve energy and wait for the storage 22 to become recharged to a sufficient threshold. Through the repeated collection and release of energy, the system may operate in a periodic or "breathing" manner. The operation of the wine capsule 10 in this manner is illustrated graphically in FIG. 2.

In some embodiments, the temperature sensor may comprise a thermocouple 23. For example, an RF antenna may be configured to act as a thermocouple 23 when it is in a non-inductive state, i.e., when it is not being interrogated by a remote device. In such a configuration, the RF antenna 23 may be made of two different metals connected (e.g., brazed, soldered, printed, etc.) through one or more junctions (e.g., sensing junctions such as a cold junction or a t-junction). When a current is passed through each metal, the two different metals may reveal two different voltages, each of which may be measured. The ambient temperature can be calculated using the voltage difference. Accordingly, the intelligent wine capsule 10 may be configured to introduce current into the metals of the RF antenna 23, such as once the storage 22 reaches a predetermined discharge level, as is subsequently explained. The discharge will thus cause the inactive antenna 23 to act as a thermocouple, through which the ambient temperature may be measured. The temperature data from the thermocouple 23 can be stored in the memory 13 in any of the manners subsequently described. In this way, an RF antenna 23 may act as both a wireless communicator when it is interrogated by a remote device and as a temperature sensor when a voltage is applied to one side of the T-junction, reducing the number of components that must be incorporated into the intelligent wine capsule 10.

In some embodiments, more than one temperature sensor may be provided. For example, a first temperature sensor may act as a primary temperature sensor and a second temperature sensor may act as a backup temperature sensor. For instance, the temperature sensor may include an electrical temperature sensor which acts as a primary temperature sensor, and a thermocouple, such as may be configured into the RF antenna 23, which acts as a backup temperature sensor.

The memory 13 is configured to store information recorded by the temperature sensor. The temperature sensor 23 may generate a temperature signal (e.g., a voltage) that is communicated and received by the processor. The processor 16 may then generate data representative of the temperature signal (e.g., a digital data) and communicate it to the memory 13. It should be understood that an analog-to-digital converter that converts the analog temperature signal into digital data is considered to be part of the processor 16, even if it is located remotely from the processor. Similar conversion process(es) may apply to signals received from other sensors 25.

Stored information may comprise information obtained by the processing of the raw data from the temperature sensor 23. For instance, in some embodiments the processor 16 may be programmed to more precisely calculate or estimate the temperature profile of the beverage within the container (e.g., wine within the bottle) based on the temperature readings from the temperature sensor 23 and optionally information relating to a number of previous temperature readings, which may relate to the duration (determined from time stamps) at which a certain temperature or temperature range is maintained.

The wireless communicator is configured to transmit the stored information to a remote device. The wireless communicator may comprise RFID (radio frequency identification) communication components 18, 23, NFC (near field communication) communication components 19, 21, a Bluetooth or other UHF-based transmitter, a combination thereof, and/or any other wireless communications technologies.

The remote device can include a personal computer, a smartphone or tablet, or a dedicated reader device which is configured to communicate with and receive information from the wireless communicator. The remote device may contain an application, or "app", that is configured to communicate with and receive information from the wireless communicator. In this way, a user may access the application, and using the application the user may interrogate, or request information from, the wireless communicator. Alternatively, certain information may automatically be communicated from the wireless communicator to the remote device, such as when a connection may be made.

In some embodiments, the wireless communicator may comprise multiple different components. For instance, in some embodiments, the wireless communicator may comprise both an RFID communication module 18, or antenna 23, and an NFC communication module 19, or antenna 21. The combination of an RFID communication components and an NFC communication components may provide the intelligent wine capsule 10 with multiple communication functionalities. For instance, a first communication technology (e.g., the RFID technology) might be designed for use by winemakers, distributors, and retailers and a second communication technology might be designed for use by consumers. In this way, the information that may be accessed using a first communication technology may differ from the information that may be accessed using a second communication technology (e.g., the NFC technology). The use of multiple communication functionalities provides that the interaction between the a remote device and the intelligent wine capsule 10 may be optimized for both winemakers, distributors, and/or retailers on one hand and customers on the other hand.

For instance, the RFID antenna 23 may be interrogated on a regular or semi-regular basis, such as during shipment or storage of the wine bottle. In this way, the intelligent wine capsule 10 may be configured to provide a warning regarding a detrimental temperature reading, such that may allow the manufacturer, distributor, or retailer take action in order to prevent degradation of the product. Similarly, information from one or more additional sensors may be transmitted via the RFID antenna 23, providing updates on the location, handling, or quality of care of the bottle of wine. Accordingly, the intelligent wine capsule 10 of embodiments of the present disclosure may provide benefits relating to product chain management, fleet management, and the like. The same warning system may be employed in a consumer's wine cellar, for example, and could provide a consumer with an early warning indication should a temperature fluctuation occur.

The NFC antenna 21, on the other hand, may be interrogated by a consumer, such as by moving a remote device, e.g., a smartphone, into the immediate vicinity of the intelligent wine capsule 10 or by tapping the intelligent wine capsule 10 with the remote device. In this way, a potential purchaser may be able to obtain an array of data about the bottle of wine, including for example the temperature history of the bottle, information from one or more additional sensors that may be incorporated into the capsule, information about the varietal(s) of grape and the percentages of each varietal in the wine, information about the vintage of the wine, geographical (e.g., GPS) information about the winemaker, geographical information about the grapes in the wine, advertising information for the wine or winemaker, cost and other sales information, and information regarding whether or not the capsule has been removed, and thus whether or not the bottle of wine may have been tampered. Such information may be correlated with one or more unique serial numbers or identifications stored in the RFID memory and/or NFC memory. In this way, the remote device can retrieve a unique identifier and use it to look up other the correlated information that would be stored in a database.

The capsule 10 may enable the purchase of a wine bottle with an NFC-enabled smart device—e.g., mobile commerce "tap-and-pay." This may include the ability to verify the age and identity of a bottle to be purchased.

This compartmentalization of user outputs provides a benefit in that it provides a first mechanism for inventory management and a second mechanism for point-of-purchase information retrieval or purchase and completion of a transaction. Alternatively, a single communication component could be configured such that certain information only be made available to a particular type or group of remote devices or users. The inclusion of multiple communication components, such as the combination of an RFID antenna 23 and an NFC antenna 21, may also provide the intelligent wine capsule 10 with multiple energy harvesting devices, providing for the capture of more ambient energy than would be achieved with either one antenna, individually.

The energy storage 22 is configured to provide power to the various components, including for example, thermocouple 23 and the wireless communicator. The energy storage 22 may comprise a small battery, which may be selected from the variety of conventional batteries that may be known in the art. Such a battery may be printed onto the wine capsule 10. In some embodiments, an energy harvester 24 is employed. The energy harvester 24 may include one or more of the RFID antenna 23, NFC antenna 21, one or more harvesting antennas 27, and photovoltaic coating 26 (or other antenna(s), not shown). Because the energy harvester 24 is capable of capturing energy from its external surroundings, the incorporation of an energy harvester 24 into a product packaging, such as an intelligent wine capsule 10, in order to power the sensor(s) and communication device(s), provides for a unit having a long lifespan (e.g., until a wine bottle is opened). This allows for the maintenance of the temperature history of a product over an extended period of time, such as may not be possible using a conventional battery. This extended lifespan may provide particular benefit for products that are kept for long periods of time, such as wine.

This manner of energy harvesting, storage, and use provides that embodiments of the intelligent wine capsule 10 may record temperatures over the lifespan of the wine bottle. In some embodiments, the intelligent wine capsule 10 may be configured to indicate whether the temperature of the beverage has exceeded an upper temperature threshold. In some embodiments, the intelligent wine capsule 10 may be configured to indicate whether the temperature of the beverage has dropped below a lower temperature threshold. And in some embodiments, the intelligent wine capsule 10 may be configured to indicate whether the temperature of the beverage has deviated from a predetermined suitable temperature range, i.e., whether the temperature has exceeded an upper threshold or dropped below a lower threshold. An embodiment of an intelligent wine capsule 10 operating in this manner is illustrated graphically in FIG. 2.

For instance, a wine temperature indicator may be configured to identify that a wine bottle has exceeded an upper temperature threshold of 72°. A wine temperature indicator may also be configured to identify that a wine bottle has exceeded a lower temperature threshold of 40°.

In some embodiments, a temperature registered by the temperature sensor may be periodically stored in the memory 13. In other embodiments, only temperatures that fall outside a predetermined suitable temperature range may be stored in the memory 13. For instance, when the temperature sensor registers a temperature that is above the upper threshold, below the lower threshold, or outside of a programmed temperature range, the registered temperature may be stored in the memory 13. However, when the temperature sensor registers a suitable temperature, the data may not be stored in the memory 13 in order to provide for a more efficient use of the available space in the memory 13. In some embodiments, the stored temperature readings may be erased when the data is communicated to a remote device. In other embodiments, the stored temperature readings may be protected against being erased, thereby ensuring that a full and complete temperature record exists throughout the life of the bottle of wine.

In some embodiments, the intelligent wine capsule 10 may also be configured to provide additional information regarding a temperature deviation. In some embodiments, for example, the intelligent wine capsule 10 may be configured to register and store information relating to the duration of time (e.g., based on time stamps) that the product spent outside the suitable temperature range. This information may help a consumer or other use identify whether a temperature deviation was likely to have brought about product degradation. In some embodiments, the unit may be programmed to make certain determinations about the likelihood of product degradation based on the combined temperature and duration data. In some embodiments, for example, the unit may be programmed so that a relatively minor temperature deviation occurring for an amount of time that falls below a minimum threshold is either not stored in the memory 13 or not indicated as being problematic when the temperature data is accessed.

In some embodiments, the intelligent wine capsule 10 may be configured to register and store information relating to the date of a temperature deviation, the time of a temperature deviation, and/or the location of the bottle at the time of a temperature deviation. This information may, for example, allow a wine maker or distributor to ensure that a product is carefully transported to a retailer without undergoing temperature degradation. In the case of undue temperature degradation, it may also allow for a wine maker or distributor to identify a temperature control breach and implement improved temperature control measures.

Embodiments of an intelligent wine capsule 10 may also comprise one or more additional sensors. For example, in some embodiments the wine capsule may comprise a humidity sensor. It is recommended that wine is stored under humid conditions in order to prevent drying out of the cork, which may lead to oxidation and/or spoilage of the wine inside the bottle. Accordingly, a humidity sensor may offer an additional layer of protection for a winemaker or consumer. The humidity sensor may be periodically activated in the same manner as the temperature sensor. Alternatively, the humidity sensor may be activated only occasionally during the periodic energy storage 22 charging and release process, such as one out of every five times that the temperature sensor is activated or one out of every ten times that the temperature sensor is activated. As with the temperature sensor, all of the humidity readings may be stored in the memory 13 or only those that fall outside of a predetermined range may be stored in the memory. For example, only low humidity readings, e.g., below a predetermined minimum safe humidity level which over time could lead to drying out of the cork and a resulting degradation of the wine, may be stored in the memory 13 for communication to a remote device. An acceptable humidity level may be 55%.

Embodiments of an intelligent wine capsule 10 may comprise a motion sensor, such as an accelerometer. Vibrations have been found to have various effects on the aging of wine. Accordingly, a motion sensor, such as an accelerometer that is configured to register significant movement, e.g., vibration, of the bottle may offer an additional layer of protection for a winemaker or consumer. The motion sensor may be periodically activated in the same manner as the temperature sensor. Alternatively, the motion sensor may be activated only occasionally during the periodic capacitor charging and release process, such as one out of every five times that the temperature sensor is activated or one out of every ten times that the temperature sensor is activated. As with the temperature sensor, all of the motion readings may be stored in the memory 13 or only those that fall outside of a predetermined range may be stored in the memory. For example, only significant motion readings, such as those over a predetermined maximum allowable level which could lead to degradation of the wine, may be stored in the memory 13 for communication to a remote device.

Embodiments of an intelligent wine capsule 10 may comprise one or more gas sensors. For instance, an intelligent wine capsule 10 may comprise an oxygen sensor, an arsenic sensor, or both. The incorporation of one or more gas sensors into an intelligent wine capsule 10 may, in most instances, only be productive in those embodiments in which a portion of the wine capsule is in fluid communication with the inside of the bottle. Accordingly, it is contemplated that the one or more gas sensors may be most suitable for inclusion in rigid wine capsules in which the underside of the capsule top portion is in fluid communication with the inside of the wine bottle, e.g., wine capsules having screw-top caps. The one or more gas sensors may thus be located on the underside of the wine capsule, such as underneath of a food-grade sealing liner (e.g., a PET liner that is conventionally provided on the inside of a screw-top cap).

Wine degradation is often caused by oxidation, such as may be brought about through exchange of gases between inside of the bottle and outside of the bottle. Accordingly, the oxygen sensor may be configured to measure the flow of oxygen into and/or out of the wine bottle. For example, the oxygen sensor may be configured to measure the flow of oxygen into the bottle, which may be used to determine whether the contents of the bottle have undergone excessive oxidation. The underside of the intelligent wine capsule 10 may be configured to allow oxygen flowing in either direction to pass by the oxygen sensor while, at the same time, preventing the wine inside the bottle from coming into contact with the oxygen sensor. For instance, the food grade sealing liner surrounding the oxygen sensor may be provided with one or more micro-holes that allow for the transfer of gases but not liquids.

The presence of arsenic in some wines has recently become a public health concern. Accordingly, the arsenic sensor may be configured to measure the presence and/or the amount of arsenic inside the wine bottle. The presence of arsenic within the wine bottle could then be identified to a potential consumer. For example, the underside of the intelligent wine capsule 10 may be configured to allow arsenic that is present in the air-space of the wine bottle to come into contact with the arsenic sensor while, at the same time, preventing the wine inside the bottle from coming into contact with the arsenic sensor. For instance, the food grade sealing liner surrounding the arsenic sensor may be provided with one or more micro-holes that allow for the transfer of gases but not liquids.

The one or more gas sensors may be periodically activated in the same manner as the temperature sensor. Alternatively, the one or more gas sensors may be activated only occasionally during the periodic energy storage 22 charging and release process, such as one out of every five times that the temperature sensor is activated or one out of every ten times that the temperature sensor is activated. As with the temperature sensor, all of the gas sensor readings may be stored in the memory 13 or only those that fall outside of a predetermined range may be stored in the memory. For example, only potentially significant gas sensor readings, such as those indicating a flow of oxygen that is over a predetermined maximum allowable level or those indicating the presence of arsenic, may be stored in the memory 13 for communication to a remote device.

Embodiments of an intelligent wine capsule 10 may comprise a location sensor, such as a GPS locator. The incorporation of a location sensor may render the bottle trackable by a remote device. It may also be employed, in coordination with the temperature sensor, in order to identify the location, e.g., where in the distribution chain, a significant temperature breach may have occurred. The location sensor may be periodically activated in the same manner as the temperature sensor. Alternatively, the location sensor may be activated only occasionally during the periodic storage 22 charging and release process, such as one out of every five times that the temperature sensor is activated or one out of every ten times that the temperature sensor is activated. In some embodiments, the location sensor may only be activated in the instance of a significant temperature reading, humidity reading, motion reading, etc. For example, only the location of the bottle during a significant reading from one of the other sensors, such as a reading of the type that could lead to degradation of the wine, may be obtained and stored in the memory 13 for communication to a remote device.

By incorporating technology into an intelligent wine capsule 10, as is presently described, a winemaker may protect itself against counterfeiting. For example, the intelligent wine capsule 10 may be configured to indicate the provenance of the wine in such a way that could not be easily replicated by a counterfeiter. The technology present in the intelligent capsule 10 will, itself, reduce the probability of counterfeiting or attempted unauthorized replication.

Additionally, embodiments of an intelligent wine capsule 10 may also be configured to indicate whether the capsule has been removed. In this manner, the intelligent wine capsule 10 may be used to indicate whether tampering may have occurred. For instance, the intelligent wine capsule 10 may be wired so that removal of the capsule breaks one or more circuits. In some embodiments, a signal indicating the breakage of the one or more circuits may be stored in the built-in memory 13 so that an indication of potential tampering can be communicated to a remote device. In other embodiments, breakage of the one or more circuits may destroy one or more functions of the intelligent wine capsule 10. Accordingly, when a user attempted to interrogate the intelligent wine capsule 10, the lack of a communication would be indicative of a tampered bottle.

An intelligent wine capsule 10 may be configured to indicate whether tampering may have occurred in a number of manners. In some embodiments, including embodiments where the wine is sealed with a cork, a portion of the electrical components on the interior of the intelligent wine capsule 10 may be adhered to a surface of the wine bottle. Accordingly, when the intelligent wine capsule 10 is removed, a first portion of the one or more electrical components remains adhered to the wine bottle while a second portion of the one or more electrical components remains on the intelligent wine capsule, resulting in a breakage of the one or more electrical components. In other embodiments, including for example embodiments where the bottle of wine is sealed with a screw-cap, a portion of the electrical components on the interior of the intelligent wine capsule 10 may span the breakage line between the screw cap and the lower skirt, such that twisting of the screw cap would result in a breakage of one or more electrical components.

Embodiments of an intelligent wine capsule 10 may also be configured to enable sales transactions. For example, the intelligent wine capsule 10 may be configured so that a consumer could interrogate the NFC antenna 21, such as using a smartphone, in order to obtain cost information, verify the consumer's age, verify that the bottle does not have any major degradation events, and/or pay for the bottle. For example, it is contemplated that all of the above could be achieved in a vending machine. Accordingly, one aspect of the present disclosure is directed to a vending machine containing wine bottles, with each wine bottle having an intelligent wine capsule 10 as described herein in proximity to a transparent, e.g. glass, front. The vending machine may be configured so that a consumer could simply tap his or her smartphone to the glass in the vicinity of the bottle that he or she desires to inquire about, thereby interrogating the NFC tag 21 of the corresponding intelligent wine capsule 10. At that point, the consumer's age could be verified and the bottle paid for, after which a signal would be sent to the vending machine to release the appropriate bottle.

The intelligent wine capsules 10 of the present disclosure may be prepared in a number of ways, including by adhesion of an electrical component-containing layer to a surface, e.g., an interior surface, of the capsule outer layer or by direct printing of the electrical components on a surface, e.g., an interior surface, of the capsule outer layer.

In some embodiments, the electrical components may be attached to a conventional wine capsule outer layer 11 by adhesion to an interior surface of the conventional wine capsule outer layer. The components may be individually adhered (e.g., printed) to the wine capsule or the components may be formed into an electronic-containing layer 30 that can be inserted into the interior of the wine capsule and adhered to an interior surface. One non-limiting manner of creating the intelligent wine capsule 10 by attaching an inner electronic-containing layer 30 to a conventional wine capsule is shown in FIGS. 5 through 7.

Figure 5A:
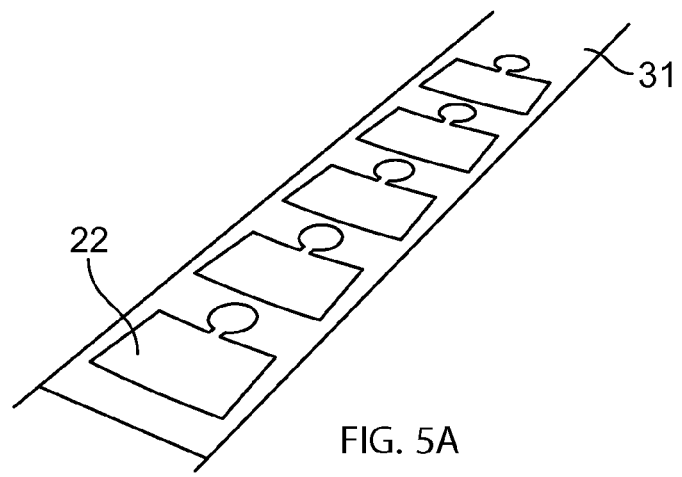
FIG. 5 depicts the first part of a flow diagram illustrating a process for manufacturing an embodiment of an intelligent wine capsule.
Figure 5B:
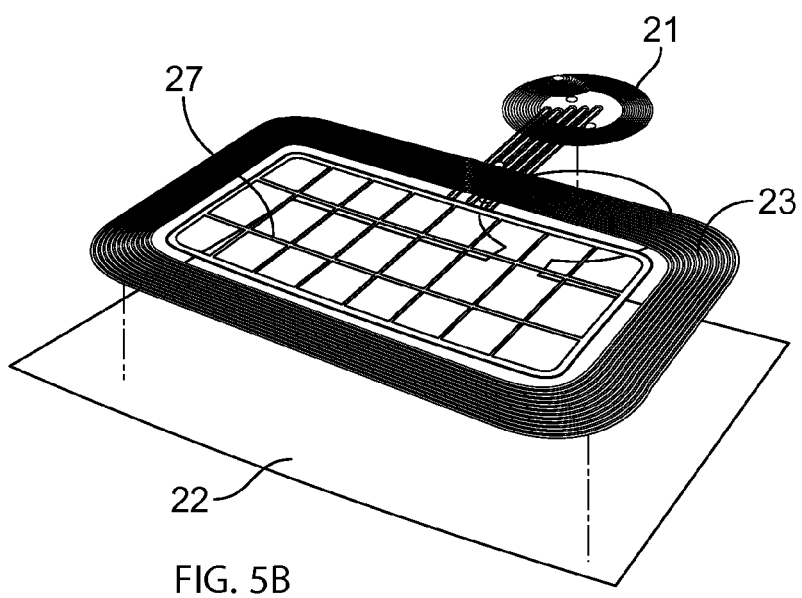

In this method, a base layer 31 or substrate, such as a PLA thin film base layer is provided. To accommodate mass production, the base layer 31 may be spooled from a roll. Next, a thin film capacitor 22 layer may be attached to the base layer 31, such as by printing of the thin film capacitor component 22 onto the base layer, as illustrated in FIG. 5A. Next, the various antennas, such as the RFID communication antenna 23, an NFC communication antenna 21, and portions of energy harvester 24 (e.g., RFID antenna 23 and/or NFC antenna 21, additional harvesting antenna 27, and/or other antennas, not shown) may be printed on top of the thin film capacitor 22 layer, as illustrated in FIG. 5B. In this manner, the antennas 21, 23, and/or 27 and the thin film capacitor 22 are integrated into a single thin film circuit component 34 (which may be in the shape of the wine capsule 10).

In some embodiments, it may be desirable to locate the NFC communication antenna 21 on the underside of the top portion of the wine capsule, as shown in the Figures. This serves a number of functions. For instance, placing of the NFC communication antenna 21 on the top portion of the wine capsule provides a consistent and easy surface for a consumer to bring a remote device, such as a smartphone, into range of the NFC communication antenna 21. Placing of the NFC communication antenna 21 on the top portion of the wine capsule also ensures that the RFID antenna 23 and wide band power harvesting antenna 20 may be printed along substantially the entire surface area of the lateral body portion, providing efficient energy harvesting capabilities.

Figure 5C:
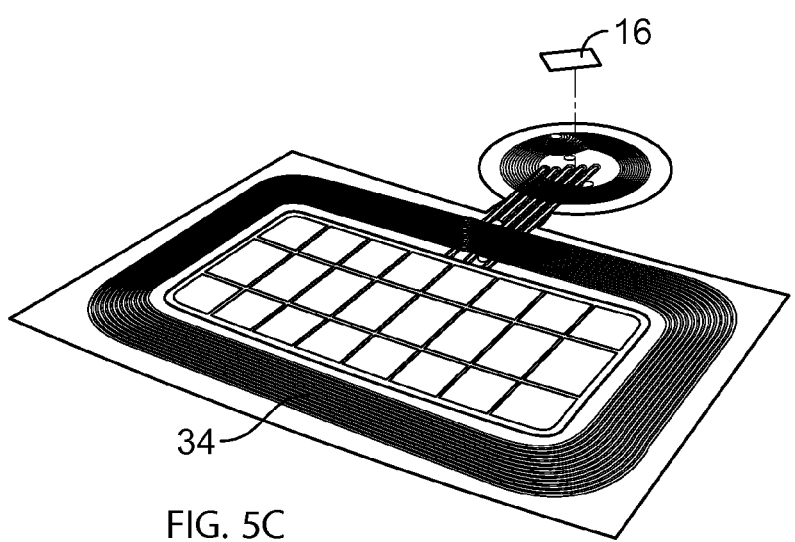

The processor 16, which may be integrated with at least the temperature sensor, the memory 13, and the control modules necessary for controlling each of the various components, may then be added to and incorporated into the thin film circuit component, as illustrated in FIG. 5C. Alternatively, the processor may be printed onto the thin film circuit component. The processor 16 may also be integrated with any of the additional sensors and components described herein. In some embodiments, it may be desirable to locate the processor 16 (optionally with integrated components) on the underside of the top portion of the capsule, as shown in the Figures. It is believed that positioning the processor 16 on the top portion of the capsule may best prevent the processor 16 from becoming damaged during shipment and retail of the wine bottle. Placing of the processor 16 on the top portion of the wine capsule also ensures that the RFID antenna 23, additional harvesting antenna 27, and/or the NFC antenna 21 may be printed along substantially the entire surface area of the lateral body portion, providing efficient energy harvesting capabilities.

Figure 5D:
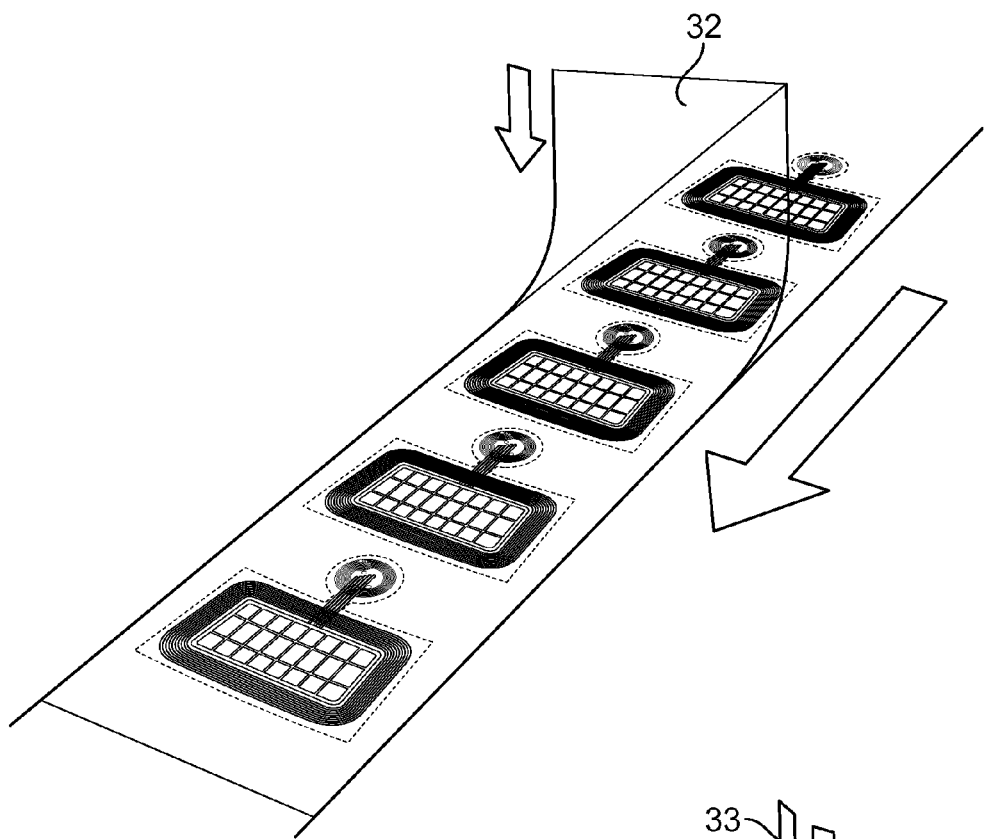

Once all the electrical components have been positioned (e.g., printed), a sealing layer 32 may be placed over top of the thin film circuit component 34, as illustrated in FIG. 5D. The sealing layer 32 may be the same as the base layer 31 or it may be different. For example, the sealing layer 32 may comprise a PLA thin film layer.

Figure 5E:
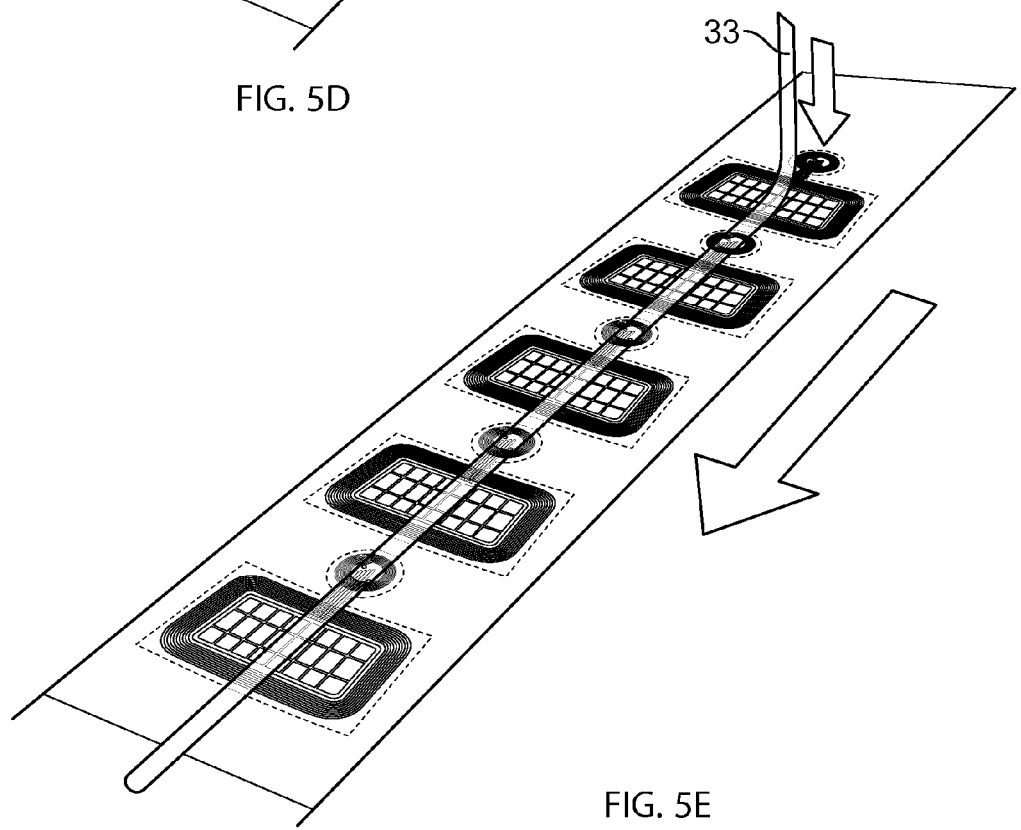

An adhesive 33 may then be applied over the sealing layer 32, as illustrated in FIG. 5E. The adhesive 33 may take on any number of forms. As shown in the Figures, the adhesive 33 may comprise a strip, such as a food-safe pressure activated adhesive strip, which is applied along a center line of the sealing layer 32, spanning both the body portion and the top portion of the capsule. In other embodiments, however, the adhesive 33 could be applied as a coating across the body portion, the top portion, or both. While the adhesive 33 is shown being applied prior to the die cutting of the electronics-containing layer 30, the adhesive could instead be applied after die cutting of the electronics layer or after forming of the die cut electronics layer into a capsule shape. Alternatively, the adhesive 33 could be applied to the interior of the outer layer 11 prior to insertion of the electronics-containing layer 30.

Figure 5F:
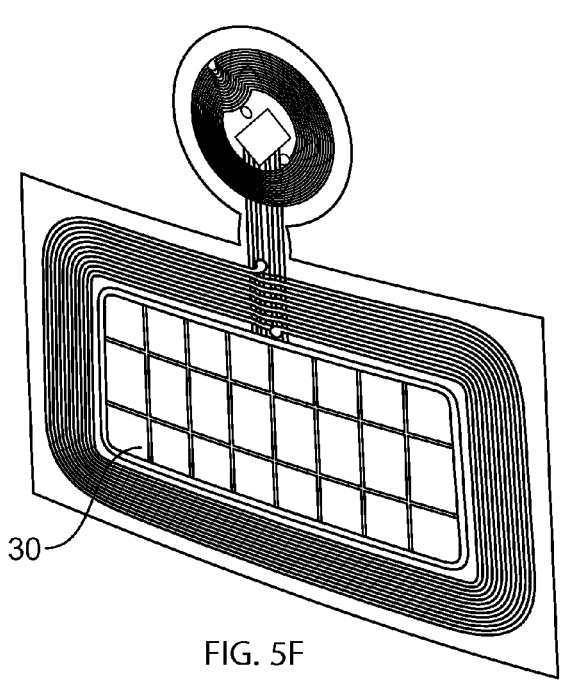
Figure 5G:
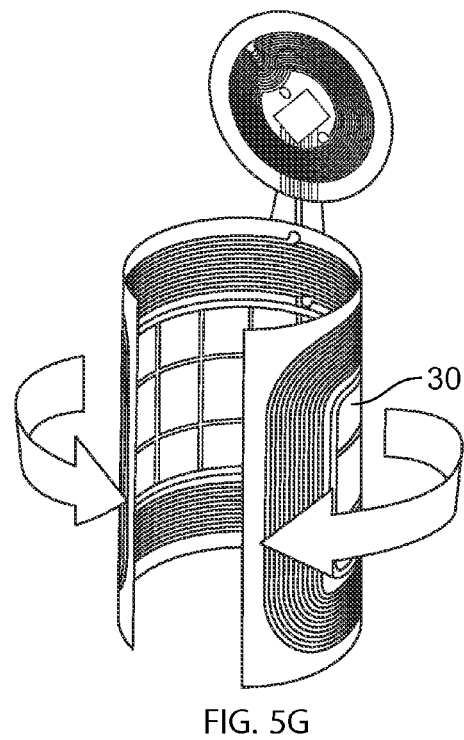
Figure 5H:
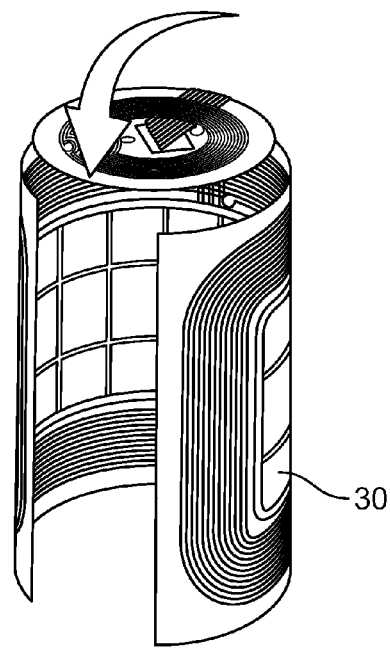
Figure 5I:
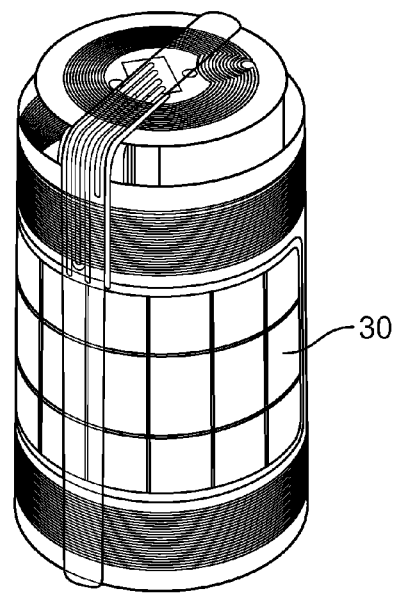

The lateral body portion and top portion of the electronics-containing layer 30 are then die cut from the sheet, forming a substantially flat electronics-containing layer, as illustrated in FIG. 5F. The substantially flat electronics-containing layer 30 is then formed into a capsule shape, such as by rolling of the sides and folding down of the top portion, as illustrated in FIGS. 5G through 5I.

Figure 6A:
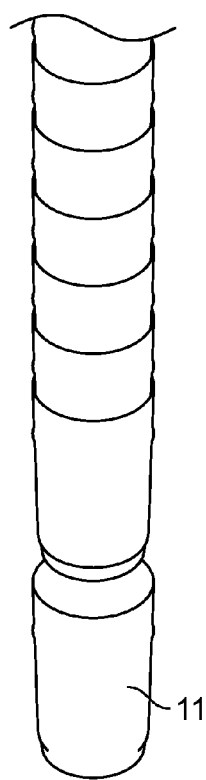
FIG. 6 depicts the second part of a flow diagram illustrating a process for manufacturing an embodiment of an intelligent wine capsule.
Figure 6B:
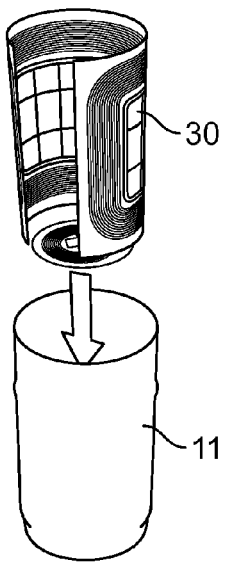
Figure 6C:
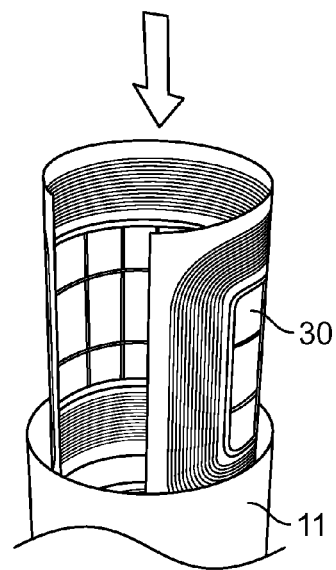
Figures 7A, 7B:
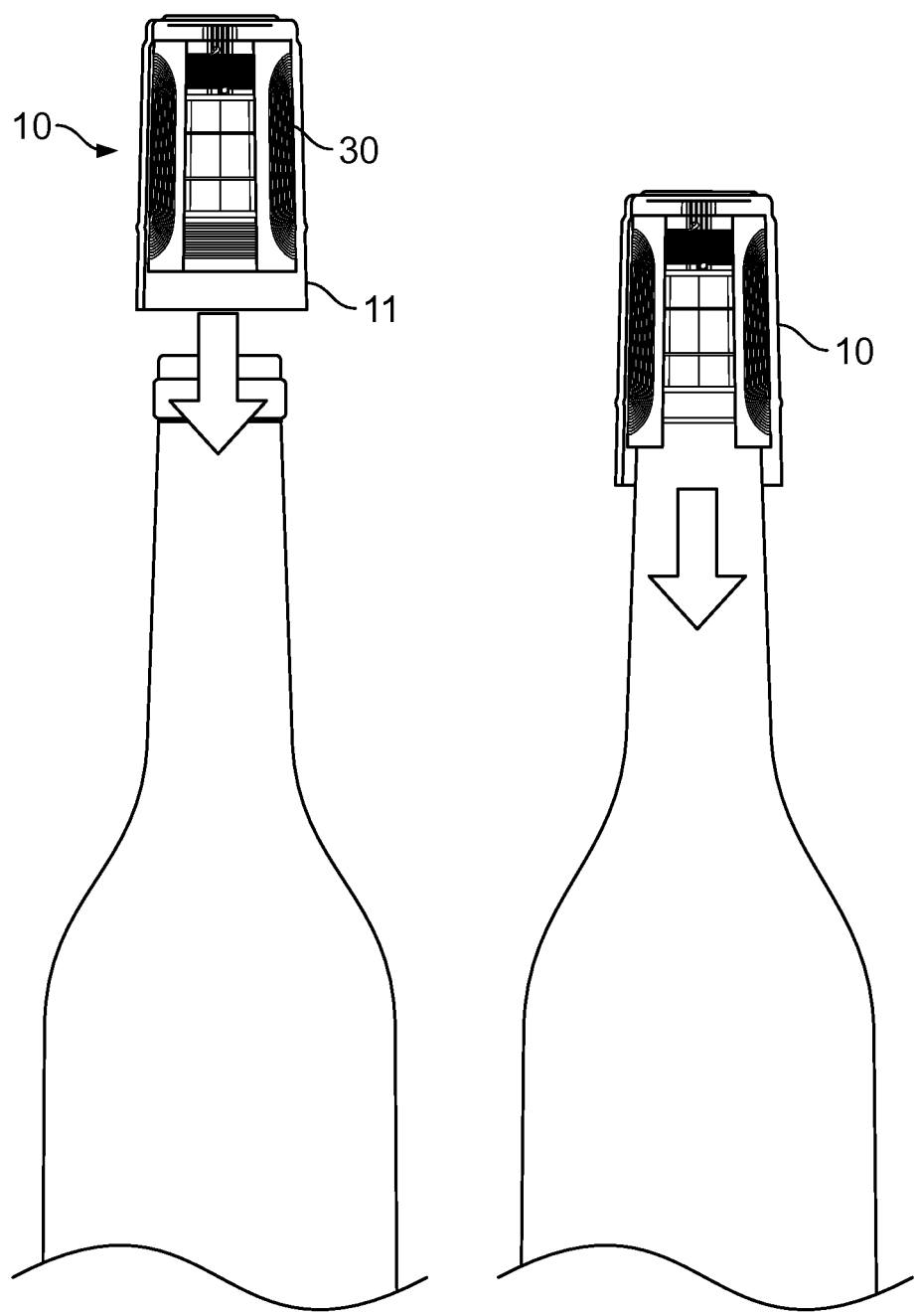
FIG. 7 depicts a flow diagram illustrating a process for application of an embodiment of an intelligent wine capsule onto a wine bottle.
Figures 7C, 7D, 7E:
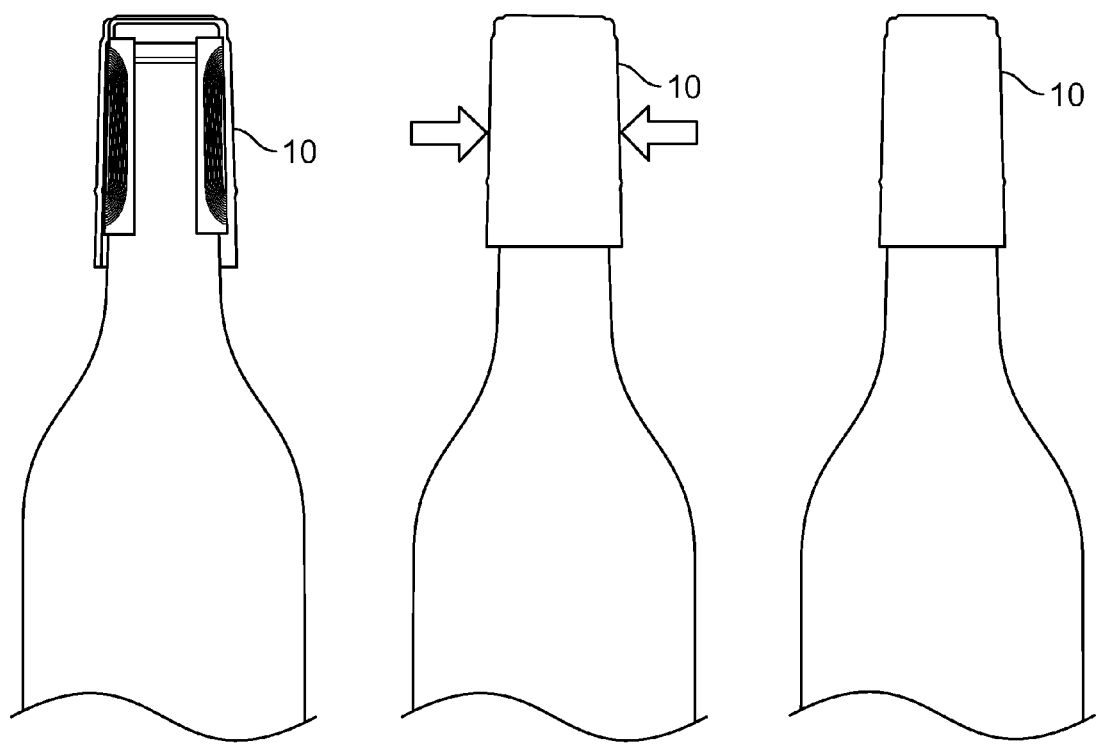

A conventional wine capsule, such as may already be printed and/or embossed with identifying or decorative logos, is then provided as an outer layer 11, as illustrated in FIG. 6A. The rolled electronic layer 30 is then placed into the interior cavity of the conventional wine capsule, as illustrated in FIGS. 6B through 6C. The adhesive 33 ensures that the electronic-containing layer 30 and the conventional wine capsule outer layer 11 remain attached to one another. In some embodiments, it may be desirable that portions of the electronic-containing layer 30, such as those portions near the edges of the electronic layer, are not adhered to the outer layer 11, as this allows for the electronic layer to flex in order to match the curvature of the outer layer, such as during application to the wine bottle.

In another non-limiting embodiment for preparing the intelligent wine capsules 10, the electrical components may be printed directly to the interior surface of the wine capsule outer layer 11 prior to forming the outer layer into a capsule shape. This process is similar to the one described above except that the base layer 31 may be the material that is used to form the outer layer 11 of the wine capsule, e.g. PVC or other flexible plastic capsule materials. Accordingly, the steps shown in FIGS. 5A through 5D may be performed as previously described in order to provide each of the electronic components on the interior of the wine capsule outer layer 11, itself. Similarly, once each of the electronic components has been printed onto the outer layer 11 of the wine capsule, each capsule may be die cut from the sheet and formed into a capsule shape, such as by rolling of the sides and folding down of the top portion, as illustrated in FIGS. 5F through 5I. Using this process, all of the electronic components may be printed onto the interior of the outer layer 11 (rendering an adhesive 33 and the incorporation steps of FIGS. 6A to 6C unnecessary).

Once each wine capsule has been rendered intelligent by the incorporation or printing of the electronic layer 30, the intelligent wine capsules 10 can be stacked and shipped in a conventional manner, as illustrated in FIG. 6F. Application of an intelligent wine capsule 10 to a wine bottle may also be performed by conventional procedures. For instance, where the outer layer of the capsule 11 is made of a heat-shrinkable plastic, the capsule may be inserted onto the top of the wine bottle and the outer layer may be heat-shrunk to the size of the bottle neck, as illustrated in FIGS. 7A through 7E. Adhesion of the electronic layer 30 to the outer layer 11 in a manner that allows for some flexing of the electronic layer may be beneficial to assist with the heat-shrinking process.

In other non-limiting embodiments, the electronic components may be printed onto the interior or exterior of an already-formed wine capsule, such as a rigid plastic or metallic capsule. The printing of the electronic components may be performed using, for example, a conventional electronics printer such as a 3D electronics printer having five axis motion (e.g., of the sort presently produced by Optomec® under the name Aerosol Jet® 5X System). In this sort of printing process, for example, the capsule can be moved in a trace pattern while metallized ink is laid down on the desired capsule surface and then cured.

The locations of the various components on the intelligent wine capsule 10 may vary. In some embodiments, it is desirable to print all of the components on the interior of the wine capsule 10. In other embodiments, it may be desirable to print certain components, such as one or more portions of the energy harvester 24, on the exterior of the wine capsule 10. Additionally, in some embodiments it may be desirable to print certain components at specific locations on the capsule, such as on the underside or on the top of the flat cap portion, across the breakage line between the screw-cap and the lower skirt, or in the vicinity of the wine bottle transfer bead.

For example, in some embodiments the RFID antenna 23 and/or chip 18 could be printed on an interior surface of a conventional wine capsule. It may be desirable to position the RFID chip 18 at a portion of the wine capsule that sits on top of the wine bottle transfer bead upon application of the capsule to the wine bottle. Because this portion of the wine capsule in the vicinity of the bottle transfer bead does not shrink during heat shrinking, locating the RFID chip 18 in the vicinity of the bead serves to reduce stress to the electrical component when the capsule is shrunk to fit the bottle. Accordingly, in some embodiments, and especially embodiments comprising a flexible, heat-shrinkable plastic capsule, the RFID chip 18 may be positioned to sit atop the wine bottle transfer bead. Similarly, the RFID chip 18 could also be printed on an exterior surface of a conventional wine capsule in a location that was configured to sit atop the wine bottle transfer bead.

Alternatively, in some embodiments comprising a rigid capsule with a screw-cap closure, an RFID chip 18 could be printed on an interior surface of the rigid capsule so as to bridge the breakage line between the screw-cap portion of the capsule and the lower skirt portion of the capsule. Accordingly, when the screw cap is twisted by a consumer to open the bottle of wine, the RFID chip 18 will be broken. Accordingly, once opened, the intelligent wine capsule 10 will be incapable being interrogated via RFID or of harvesting energy. Similarly, the RFID chip 18 could also be printed on an exterior surface of a rigid capsule so as to bridge the breakage line between the screw-cap portion of the capsule and the lower skirt portion of the capsule.

In some embodiments, the NFC chip 19 may be printed on an interior surface of the wine capsule, and more specifically on the underside of the flat circular top portion of the wine capsule. During heat shrinking of a flexible wine capsule, the flat top portion of the capsule, in addition to the area in the vicinity of the bottle transfer bead, does not undergo shrinking. Accordingly, it may be desirable to print the NFC chip 19 on this flat top portion. Positioning of the NFC chip 19 at this location also provides the previously described benefits. In some embodiments, one or more perforations may be provided in the capsule in the area of the NFC tag. For example, a perforated seam may be provided at the center of the NFC tag. The perforations may be configured so that when the capsule is removed from the bottle of wine, the NFC tag will be broken, e.g. by destruction of the bridge, rendering the NFC tag inoperable. Similarly, the NFC chip 19 could also be printed on an exterior surface of the flat circular top portion of the wine capsule.

The energy storage component (e.g., thin film capacitor) 22 may be printed at any location on the capsule 10, such as the interior of the capsule 10. For example, in some embodiments the energy storage component 22 may be printed on the lower interior portion of the capsule skirt (below the bottle transfer bead). In embodiments in which the capsule 10 is made of a heat-shrinkable material, the energy storage component 22 may be printed in a manner that is configured to withstand shrinkage. For example, the energy storage component 22 may be printed in a saw-tooth or accordion pattern, which allows for contraction of the capsule without cracking of, for example, a capacitor. Where the capsule 10 is not made of a heat-shrinkable material, the energy storage component 22 may be printed without the saw-tooth or accordion pattern.

In embodiments comprising a photovoltaic coating 26, one or more electrical components may be printed so as to extend from an interior surface of the capsule 10 around the bottom edge of the capsule and onto an exterior surface of the capsule. This provides an electrical contact pad on the exterior surface of the capsule 10 that is electrically connected to the variety of components on the interior of the capsule surface. For example, in some embodiments the thin film capacitor 22 may extend across both an interior and exterior surface of the capsule 10. The photovoltaic coating 26 may then be coated on the exterior surface of the capsule 10, including on the exterior exposed portion of the capacitor 22. Generally, the photovoltaic coating 26 may be applied after all of the electrical components have been printed or placed onto the capsule 10. Alternatively, one or more openings in the outer layer of the capsule 10 could be provided in order to expose one or more contact pads in order to provide the electrical connection between the photovoltaic coating 26 and the electrical components such as the energy storage component 22.

Portions of the energy harvester 24 (e.g., RFID antenna 23, NFC antenna 21, additional harvesting antenna 27, and/or other antennas, not shown) may be printed at any location on the capsule, and desirably on the exterior of the capsule. For example, in some embodiments the RFID antenna 23, additional harvesting antenna 27, and/or NFC antenna 21 may be printed on the lower exterior portion of the capsule skirt (below the bottle transfer bead). In embodiments in which the capsule is made of a heat-shrinkable material, the RFID antenna 23, NFC antenna 21, additional harvesting antenna 27, and/or other antennas (not shown) may be printed in a manner that is configured to withstand shrinkage. For example, they may be printed in a saw-tooth or accordion pattern, which allows for contraction of the capsule 10 without cracking of the antennas 23, 27, and/or 21. Where the capsule 10 is not made of a heat-shrinkable material, the antennas 23, 27, and/or 21 may not need to be printed with a saw-tooth or accordion pattern.

The processor 16 may be bonded or printed to the electrical components using conventional techniques. In some embodiments, a sealing layer may be provided over top of the electrical components.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A data logger comprising:
   at least one energy storage component;
   an energy harvester configured to harvest electromagnetic energy and transfer the harvested electromagnetic energy to the at least one energy storage component to form stored energy;
   a temperature sensor configured to generate a temperature signal corresponding to a temperature;
   at least one processor configured to receive the stored energy from the at least one energy storage component such that the at least one processor is powered by the stored energy, receive the temperature signal, and generate data representative of the temperature signal;

at least one memory configured to receive the stored energy from the at least one energy storage component such that the at least one memory is powered by the stored energy, wherein the at least one memory is in communication with the at least one processor, wherein:

the at least one memory comprises non-volatile memory;

the at least one memory is configured to store a series of the data representative of the temperature signal over time;

the at least one processor and the at least one memory are configured to turn ON only after a voltage of the stored energy exceeds a pre-defined threshold;

while the at least one processor and the at least one memory are ON, the at least one memory is configured to store at least one of the data representative of the temperature signal;

while the at least one processor and the at least one memory are ON, the at least one memory and the at least one processor are configured discharge the at least one energy storage component such that the voltage of the stored energy drops below the pre-defined threshold;

after the data representative of the temperature signal is stored, the at least one processor and the at least one memory are configured to turn OFF; and at least one wireless communicator configured to wirelessly transmit the data representative of the temperature signal.

2. The data logger of claim 1, wherein the at least one energy storage component comprises at least one capacitor.

3. The data logger of claim 1, further comprising a photovoltaic coating, wherein the photovoltaic coating is configured to receive light and responsively generate energy, and wherein the energy generated by the photovoltaic coating is stored in the at least one energy storage component.

4. The data logger of claim 1, wherein the at least one wireless communicator comprises a radio-frequency identification (RFID) communication component.

5. The data logger of claim 4, wherein the RFID communication component comprises an antenna that also serves as the temperature sensor.

6. The data logger of claim 5, wherein the antenna of the RFID communication component comprises two different metals connected by one or more sensing junctions.

7. The data logger of claim 1, wherein the at least one wireless communicator comprises a near-field communication (NFC) component.

8. The data logger of claim 1, wherein the at least one wireless communicator comprises an RFID communication component and an NFC component.

9. The data logger of claim 1, further comprising at least one of a humidity sensor, a motion sensor, a location sensor, or a gas sensor.

10. The data logger of claim 1, wherein the data logger is configured to indicate whether the temperature has deviated outside of a predetermined temperature range.

11. The data logger of claim 10, wherein the at least one memory is configured to store the data representative of the temperature signal only if the temperature has deviated outside of the predetermined temperature range.

12. The data logger of claim 10, wherein the predetermined temperature range includes an upper temperature threshold.

13. The data logger of claim 10, wherein the predetermined temperature range includes a upper temperature threshold and a lower temperature threshold.

14. The data logger of claim 1, wherein the data logger is arranged inside of a wine capsule.

15. The data logger of claim 14, wherein the data logger is adhered to an inner surface of the wine capsule.

16. The data logger of claim 14, wherein the data logger comprises a thin film capacitor layer including the at least one capacitor adhered to a base layer, which is adhered to an inner surface of the wine capsule.

17. The data logger of claim 16, wherein the at least one wireless communicator is printed onto the thin film capacitor layer.

18. The data logger of claim 14, wherein the at least one processor is arranged on an inner surface of a top portion of the wine capsule.

19. The data logger of claim 1, wherein the at least one memory is configured to store data representative of at least one of varietals of grape, percentages of each varietal in a wine, vintage, information about a winemaker of the wine, geographical information about the grapes, geographical information about the winemaker, advertising information, or cost of a wine bottle holding the wine.

20. A method comprising:
receiving electromagnetic energy at an energy harvester to form harvested electromagnetic energy;
transferring the harvested electromagnetic energy to at least one energy storage component to form stored energy;
after a voltage of the stored energy exceeds a pre-defined threshold, turning ON at least one processor and at least one non-volatile memory, wherein the at least one processor and the at least one non-volatile memory are powered by the stored energy;
while the at least one processor and the at least one non-volatile memory are activated:
receiving a temperature signal at the at least one processor from a temperature sensor;
storing data representative of the temperature signal in the at least one non-volatile memory; and
discharging the stored energy such that the voltage of the stored energy drops below the pre-defined threshold; and
turning OFF the at least one processor and the at least one non-volatile memory after the data representative of the temperature signal has been stored in the at least one non-volatile memory.

21. The method of claim 20, wherein the data representative of the temperature signal is only stored in the at least one non-volatile memory if the temperature has deviated outside of a predetermined temperature range.

22. The method of claim 20, further comprising:
receiving light at a photovoltaic coating;
in response to receiving the light at the photovoltaic coating, generating photovoltaic energy; and
storing the photovoltaic energy in the at least one energy storage component.

23. The method of claim 20, further comprising wirelessly transmitting the data representative of the temperature signal with a wireless communicator.

24. The method of claim 23, wherein the wireless communicator comprises at least one radio-frequency identification (RFID) communication component.

25. The method of claim 24, wherein the at least one RFID communication component comprises an antenna that also serves as the temperature sensor.

26. The method of claim 25, wherein the antenna of the RFID communication component comprises two different metals connected by one or more sensing junctions.

27. The method of claim 24, wherein the wireless communicator further comprises at least one near field communication (NFC) component.

* * * * *